(12) United States Patent
Zhu

(10) Patent No.: US 11,531,631 B2
(45) Date of Patent: Dec. 20, 2022

(54) STORAGE DEVICE AND CONTROL METHOD FOR STORAGE DEVICE

(71) Applicant: Hitachi, Ltd., Tokyo (JP)

(72) Inventor: Chenqi Zhu, Tokyo (JP)

(73) Assignee: HITACHI, LTD., Tokyo (JP)

(*) Notice: Subject to any disclaimer, the term of this patent is extended or adjusted under 35 U.S.C. 154(b) by 132 days.

(21) Appl. No.: 17/200,678

(22) Filed: Mar. 12, 2021

(65) Prior Publication Data

US 2022/0138123 A1    May 5, 2022

(30) Foreign Application Priority Data

Nov. 5, 2020   (JP) .............................. JP2020-185353

(51) Int. Cl.
*G06F 13/12*      (2006.01)
*G06F 13/16*      (2006.01)

(52) U.S. Cl.
CPC ................................. *G06F 13/1668* (2013.01)

(58) Field of Classification Search
CPC .. G06F 13/1668; G06F 3/0604; G06F 3/0689; G06F 3/0653; G06F 2/0617; G06F 3/0607
See application file for complete search history.

(56) References Cited

U.S. PATENT DOCUMENTS

| | | | | |
|---|---|---|---|---|
| 6,738,870 B2* | 5/2004 | Van Huben | ....... | G06F 15/17381 711/147 |
| 7,120,740 B2* | 10/2006 | Takase | .................. | G06F 3/0604 711/112 |
| 8,898,396 B2* | 11/2014 | Mejdrich | .............. | H04L 49/901 711/147 |
| 9,904,278 B2* | 2/2018 | Ogino | ................ | G05B 19/4141 |
| 10,318,450 B2* | 6/2019 | Kaminski | ........... | G06F 13/1663 |
| 2016/0142335 A1 | 5/2016 | Makida et al. | | |

FOREIGN PATENT DOCUMENTS

JP          2016-099746 A       5/2016

\* cited by examiner

*Primary Examiner* — Cheng Yuan Tseng

(74) *Attorney, Agent, or Firm* — Procopio, Cory, Hargreaves & Savitch LLP

(57) ABSTRACT

The number of QoS group execution IO with respect to a logical device is retained in both of an inter-controller shared memory and an in-controller shared memory. Then, a processor of a storage device compares the number of in-controller execution IO with an update interval threshold value set by the following expression.

Update Interval Threshold Value=("QoS Group *IO*Upper Limit Value"–("Number of QoS Group Execution *IO*" in In-Controller Shared Memory+"Number of In-Controller Execution *IO*"))×"Margin Ratio Coefficient"÷"Number of Controllers in System"

Then, the processor adds the number of in-controller execution IO to the number of QoS group execution IO of the inter-controller shared memory when the number of in-controller execution IO is greater than or equal to the update interval threshold value, and performs rewriting in the inter-controller shared memory.

6 Claims, 14 Drawing Sheets

FIG. 3

INTER-CONTROLLER SHARED  310
OPERATION INFORMATION TABLE

| QoS GROUP ID | NUMBER OF QoS GROUP EXECUTION IO (MASTER) [IOPS] |
|---|---|
| Group#1 | 100 |
|  |  |

310a — QoS GROUP ID
310b — NUMBER OF QoS GROUP EXECUTION IO (MASTER) [IOPS]

FIG. 4

IN-CONTROLLER OPERATION INFORMATION TABLE — 320

| QoS GROUP ID (320a) | NUMBER OF QoS GROUP EXECUTION IO (PREVIOUS VALUE) [IOPS] (320b) | NUMBER OF IN-CONTROLLER EXECUTION IO (UPDATE VALUE) [IOPS] (320c) |
|---|---|---|
| Group#1 | 100 | 10 |

FIG. 5

CONFIGURATION
INFORMATION TABLE    300

| QoS GROUP ID | QoS GROUP IO UPPER LIMIT VALUE [IOPS] | NUMBER OF CONTROLLERS IN SYSTEM |
|---|---|---|
| Group#1 | 100 | 2 |
|  |  |  |

300a / 300b / 300c

LDEV ··· LOGICAL DEVICE

S109: NOTE updatelimit = (( qu − $qe_{pre}$ − $ce_{upd}$ ) × k )) / d

FIG. 10

INTER-CONTROLLER SHARED
OPERATION INFORMATION TABLE  410

410a  410b

| QoS GROUP ID | QoS GROUP EXECUTED DATA TRANSMISSION AMOUNT (MASTER) [MBPS] |
|---|---|
| Group#1 | 100 |
|  |  |

FIG. 11

IN-CONTROLLER OPERATION INFORMATION TABLE  420

| QoS GROUP ID (420a) | GROUP EXECUTION DATA TRANSMISSION AMOUNT (PREVIOUS VALUE) [MBPS] (420b) | IN-CONTROLLER OPERATION INFORMATION TABLE (420c) |
|---|---|---|
| Group#1 | 100 | 10 |
|  |  |  |

FIG. 12

CONFIGURATION
INFORMATION TABLE  400

| QoS GROUP ID | DATA TRANSMISSION AMOUNT UPPER LIMIT VALUE[MBPS] | NUMBER OF CONTROLLERS IN SYSTEM |
|---|---|---|
| Group#1 | 100 | 2 |
| | | |

400a / 400b / 400c

S209: NOTE

UPDATELIMIT = (( QU − $QE_{pre}$ − $CE_{upd}$ ) × k )) / d

STORAGE DEVICE AND CONTROL METHOD FOR STORAGE DEVICE

BACKGROUND OF THE INVENTION

1. Field of the Invention

The present invention relates to a storage device and a control method for a storage device, and in particular, relates to a storage device and a control method for a storage device preferable for checking the upper limit of access in highly accurate without degrading IO performance of a storage in a case where a storage access service is provided by grouping logical devices.

2. Description of the Related Art

In the field of an information processing system, a storage device controlling a hard disk (HD) device or the like has been widely used from the related art, independently from a host computer.

In such a storage device, it is necessary to perform control in which sufficient IO performance is ensured even with respect to each logical device while ensuring the entire throughput for performing access with respect to a plurality of logical devices (volumes). A control technology for such a storage device, for example, is disclosed in JP 2016-99746 A. In the technology described in JP 2016-99746 A, in a storage management device, in order to easily adjust a band limitation width with suppressed performance interference, with respect to a plurality of volumes, the storage management device performs IO control for acquiring load information of a Tier pool including the plurality of volumes, for calculating the entire band width of the Tier pool, on the basis of the load information, for calculating each individual band width to be the total band width of the individual band width assigned to each of the volumes, and for assigning each of the individual band widths to each of the volumes.

Recently, a case increases in which the same physical storage is shared in a plurality of services, in accordance with the generalization of server virtualization or the prevalentness of a cloud service. In the public cloud, there is a need for a multi-tenant allowing a plurality of companies (services) to coexist, and in the private cloud, allowing applications having different business important degrees to coexist has also increased.

In such a service (an application), there is a difference in the urgency of business processing or a data amount to be handled, and thus, a service level (a throughput or a response time) requested with respect to the storage inevitably varies. For this reason, in the storage device, in order to suppress performance interference between services and to provide constant performance and constant quality, a function for effectively utilizing the resource on the storage side, such as flexible resource allocation, and the setting of a priority order in a service or a time zone having strict performance requisites, has been important.

As described above, in the storage device, a function (control) for providing service quality with respect to IO is generally referred to as a quality of service (QoS) function (control).

For example, in JP 2016-99746 A of the technology of the related art, a band width is assigned to each volume and is controlled by the QoS function of logical device (volume) unit.

However, in the case of a multi-tenant including a cloud environment, it is also considered to provide a service by using a plurality of logical devices even in one tenant. In order to respond to such a service form, it is necessary to provide a service level in group unit in which the plurality of logical devices are bundled, and in order to respond thereto, the concept of a QoS group has been proposed. The QoS group is aggregation in which the plurality of logical devices are bundled, and in the case of defining the QoS group, the logical devices in the QoS group can be collectively subjected to the QoS control. Accordingly, a flexible system construction suitable for the operation in the cloud environment can be built.

However, in JP 2016-99746 A of the technology of the related art, the QoS control in which the logical devices are bundled is not considered. In particular, it is general that a plurality of controllers are provided in a large-sized storage device, but in the technology of the related art, operation information of the logical device is not shared in the controllers, and thus, an IO situation of the entire QoS group is not capable of being grasped, and an upper limit value in the entire group is not capable of being controlled. In addition, the operation information used in the technology of the related art can also be changed to an inter-controller shared memory that can be accessed from all of the controllers, but in a case where the logical devices in the QoS group step over the plurality of controllers, the IO performance is degraded by the QoS control.

SUMMARY OF THE INVENTION

An object of the invention is to provide a storage device that is capable of checking the upper limit of access in highly accurate without degrading IO performance of a storage in a case where a storage access service is provided by grouping logical devices.

The configuration of the storage device for attaining the object described above preferably is a storage device performing reading and writing of data with respect to a logical device, in accordance with an IO request from a host, in which the storage device includes one or more controllers, and one or more storage devices storing data, the controller includes a processor executing IO processing with respect to the IO request from the host, and a main memory storing control information of the IO processing, the main memory is divided into an in-controller shared memory that is accessed by only an own controller and an inter-controller shared memory that can be accessed by the other controller, stores the number of first group execution IO with respect to a logical device group, in the inter-controller shared memory, stores the number of second group execution IO with respect to the logical device group, and the number of in-controller execution IO, in the in-controller shared memory, and stores an upper limit value of the number of IO with respect to the logical device group, in the in-controller shared memory, the storage device performs queueing on an IO queue corresponding to each logical device when there is the IO request from the host, the processor of the storage device fetches an IO request from the queued IO queue, the processor of the storage device accesses the in-controller shared memory, and acquires the upper limit value of the number of IO with respect to the logical device group, the number of second group execution IO with respect to the logical device group, and the number of in-controller execution IO, the processor of the storage device compares the upper limit value of the number of IO with respect to the logical device group with a sum of the number of second group execution IO with respect to the logical device group and the number of in-controller execution IO, increments the number of in-controller execution IO when the sum of the number of second group execution IO with respect to the logical device group and the number of in-controller execution IO is less than the upper limit value of the number of IO with respect to the logical device group, and performs rewriting in the in-controller shared memory, the processor of the storage device compares the number of in-controller execution IO with an inter-controller shared memory update interval threshold value set by the following expression:

Inter-Controller Shared Memory Update Interval Threshold Value=("Upper Limit Value of Number of *IO* with respect to Logical Device Group"–("Number of Second Group Execution *IO* with respect to Logical Device Group"+"Number of *In*-Controller Execution *IO*"))×"Margin Ratio Coefficient"÷"Number of Controllers in System", the processor of the storage device acquires the number of first group execution IO with respect to the logical device group when the number of in-controller execution IO is greater than or equal to the inter-controller shared memory update interval threshold value, the processor of the storage device adds the number of in-controller execution IO to the number of first group execution IO with respect to the logical device group, and performs rewriting in the inter-controller shared memory, and the processor of the storage device writes the added number of first group execution IO with respect to the logical device group in the number of second group execution IO with respect to the logical device group of the in-controller shared memory, and clears the number of in-controller execution IO of the in-controller shared memory.

According to the invention, it is possible to provide a storage device that is capable of checking the upper limit of access in highly accurate without degrading IO performance of a storage in a case where a storage access service is provided by grouping logical devices.

BRIEF DESCRIPTION OF THE DRAWINGS

FIG. 3 is a diagram illustrating an example of an inter-controller shared operation information table according to a first embodiment;

FIG. 4 is a diagram illustrating an example of an in-controller operation information table according to the first embodiment;

FIG. 5 is a diagram illustrating an example of a configuration information table according to the first embodiment;

FIG. 10 is a diagram illustrating an example of an inter-controller shared operation information table according to a second embodiment;

FIG. 11 is a diagram illustrating an example of an in-controller operation information table according to the second embodiment;

FIG. 12 is a diagram illustrating an example of a configuration information table according to the second embodiment;

DETAILED DESCRIPTION OF THE PREFERRED EMBODIMENTS

Hereinafter, each embodiment according to the invention will be described with reference to FIG. 1 to FIG. 14.

First Embodiment

Hereinafter, a first embodiment according to the invention will be described with reference to FIG. 1 to FIG. 9.

First, the configuration of a storage system according to the first embodiment of the invention will be described with reference to FIG. 1 and FIG. 2.

Figure 1:
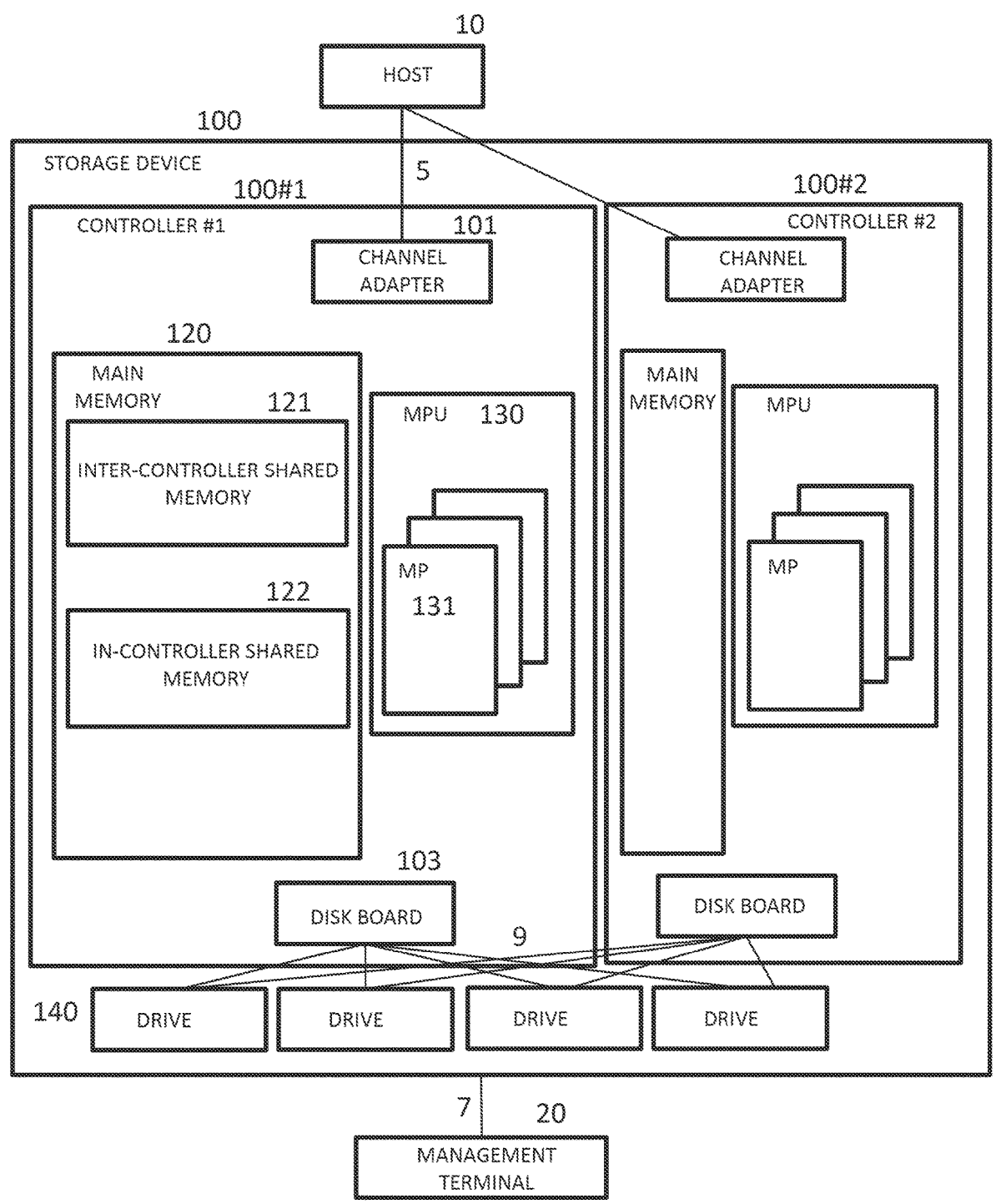
FIG. 1 is a hardware configuration diagram of a storage system.

As illustrated in FIG. 1, the storage system according to the first embodiment has a configuration in which a host 10, a storage device 100, and a management terminal 20 are connected. In such a storage system, the host 10 and the storage device 100 are connected through a host-storage interface 5, and the management terminal 20 and the storage device 100 are connected through a network interface 7.

The host-storage interface 5, for example, is an interface that is capable of transmitting large volumes of data for connecting the host 10 and the storage device 100, for connecting so-called storage area network, such as a fiber channel and an internet small computer systems interface (iSCSI). The network interface 7, for example, is an interface that connects a global network such as a premise network or the Internet.

The host 10 is an information processing device that executes application software and performs reading and writing of data stored in the storage device 100. The storage device 100 is a device that is also referred to as a disk control device (disk controller: DKC), controls a plurality of drives, responds to an IO request from the host 10, and performs reading and writing of the data stored in the drive. The management terminal 20 is a terminal that performs management by inputting a management command to the storage device 100 from a manager or by displaying an operation situation of the storage device 100.

The IO request, for example, is a READ command or a WRITE command that is issued with respect to a logical storage region of the storage device 100 from the host 10. In the READ command or the WRITE command, an address with respect to the logical storage region (logical unit) and a data length are designated as a parameter. Note that, herein, the IO request with respect to the storage device 100 from the host 10 may be simply referred to as "IO".

In general, the storage device 100 includes one or more controllers 110. The controller is a part that performs access control with respect to the drive in the storage device 100. It is general that the storage device 100 includes the plurality of controllers 110 in order to improve the entire IO performance. Note that, in FIG. 1, two controllers are illustrated as a controller #1: 110 #1 and a controller #2: 110 #2.

A drive 140 is an auxiliary storage device storing large volumes of data, and for example, is a magnetic storage device such as a hard disk drive (HDD) or a non-volatile semiconductor storage device such as a solid state drive (SSD).

The storage device 100 and the drive 140 are connected through a disk interface 9. The disk interface 9, for example, is an interface such as a serial attached SCSI (SAS) or a non-volatile memory express (NVMe).

The controller 110 includes a channel adapter 101, a main memory 120, an MPU 130, and a disk board 103.

The channel adapter 101 is a device that is an adapter for connecting the host 10 and each of the controllers 110 through the host-storage interface 5. The main memory 120 is a volatile semiconductor storage device such as a dynamic RAM (DRAM) that retains work data or a command when the storage device is operated. The micro processor unit (MPU) 130 is a processing device that executes a control program and controls the controller 110. The MPU 130 includes a plurality of MPs (cores) 131 that are capable of independently processing each thread. The disk board 103 is a device that connects the storage device 100 and the drive 140 through the disk interface 9. As illustrated in FIG. 1, each of the disk boards 103 is connected to a plurality of drives 140, and in general, each of the drives 140 is connected to the disk board 103 of the plurality of controllers 110.

The main memory 120 includes an inter-controller shared memory 121 and an in-controller shared memory 122, as a logical access region.

The inter-controller shared memory 121 is a memory region in which the access from the other controller (for example, the controller #2: 110 #2 at the time of the main memory 120 in the controller #1: 110 #1) is allowed, and the in-controller shared memory 122 is a region in which the access of only the MP 131 of the controller 110 (for example, the MP 131 of the controller #1: 110 #1 at the time of the main memory 120 in the controller #1: 110 #1) is allowed.

In general, the inter-controller shared memory 121 requires a processing time 100 to 1000 times that of the in-controller shared memory 122 due to the overhead of data transmission and processing at the time of being accessed by the other controller.

Next, a function configuration of the storage device will be described with reference to FIG. 2.

Figure 2:
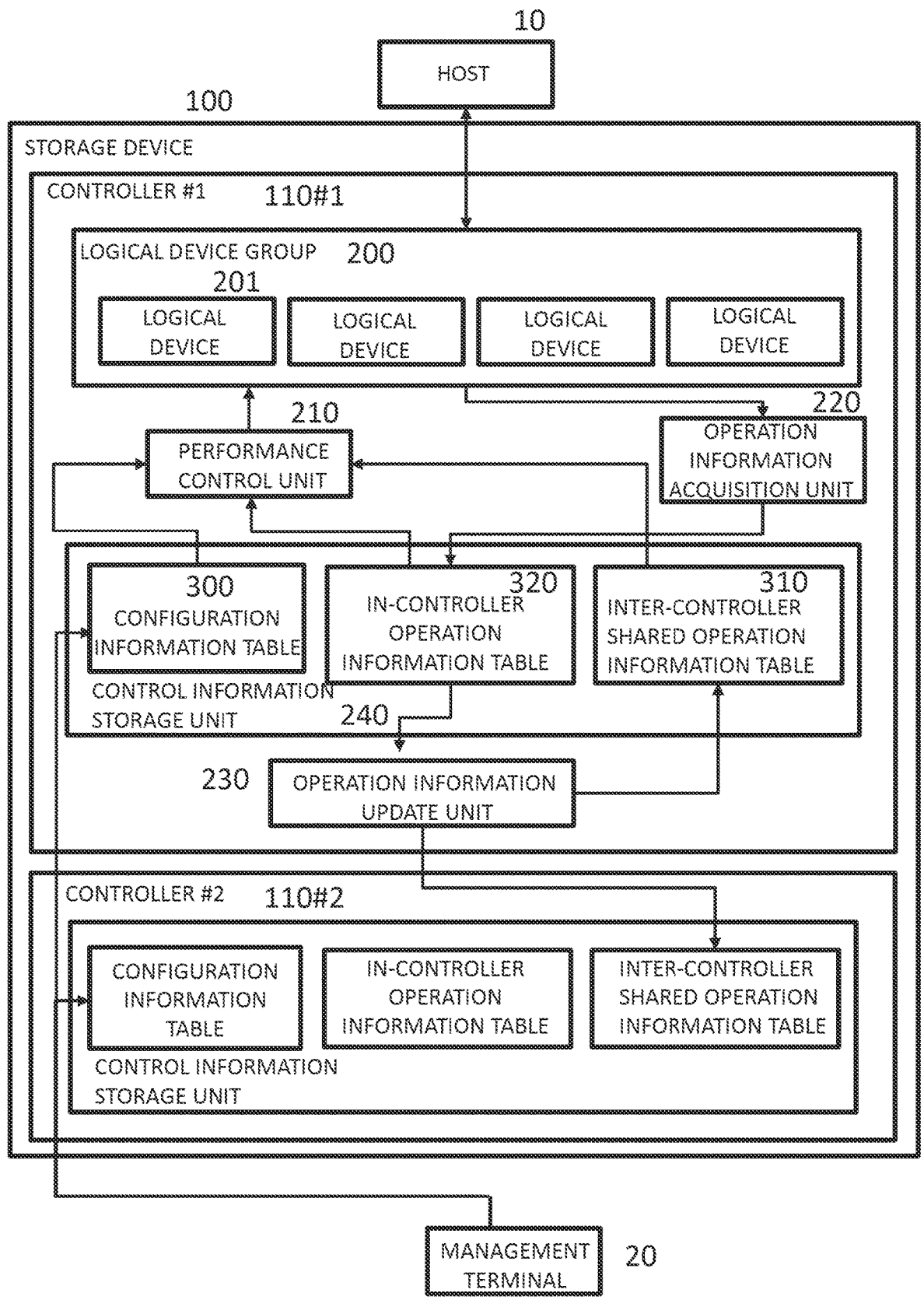
FIG. 2 is a function configuration diagram of the storage device.

As illustrated in FIG. 2, the storage device 100 includes each function unit such as a performance control unit 210, an operation information acquisition unit 220, an operation information update unit 230, and a control information storage unit 240, and includes a logical device group 200 including logical devices 201 as logical access unit of data. Note that, each of the function units is attained by executing the MP 131 with a control program of the storage device 100. In addition, in FIG. 2, in the controller #2: 110 #2, only the control information storage unit 240 is illustrated, but it is obvious that the controller #2: 110 #2 includes the same function units as those of the controller #1: 110 #1.

The performance control unit 210 is a function unit that controls access performance with respect to the logical device 201, with reference to control information stored in the control information storage unit 240. The operation information acquisition unit 220 is a function unit that acquires access information of the logical device 201 (operation information of IO) and writes the access information in the control information stored in the control information storage unit 240. The operation information update unit 230 is a function unit that reflects the control information written in the in-controller shared memory 122 on the inter-controller shared memory 121 (the details will be described below). The control information storage unit 240 is a function unit that stores the control information for performance control in the controller 110. A configuration information table 300, an inter-controller shared operation information table 310, and an in-controller operation information table 320 are provided as a table retaining the control information of the control information storage unit 240. Among them, the configuration information table 300 and the in-controller operation information table 320 are a table retained in the in-controller shared memory 122, and the inter-controller shared operation information table 310 is a table retained in the inter-controller shared memory 121.

Next, a data structure that is used in the storage device of the first embodiment will be described with reference to FIG. 3 to FIG. 5.

The inter-controller shared operation information table 310 is a table for managing the control information with respect to the QoS group shared in the controllers that is placed on the inter-controller shared memory 121, and as illustrated in FIG. 3, includes each field of a QoS group ID 310*a* and the number 310*b* of QoS group execution IO (a master).

In the QoS group ID 310*a*, an identifier uniquely representing a QoS group that is a control target is stored. In the number 310*b* of QoS group execution IO (the master), the number of IO per unit time with respect to a logical device belonging to a target QoS group that is executed by all of the controllers in the system of the QoS group is stored. The details of the number of IO will be described below.

The in-controller operation information table 320 is a table for managing the control information with respect to the QoS group and local control information in the own controller that is placed on the in-controller shared memory 122, and as illustrated in FIG. 4, includes each field of a QoS group ID 320*a*, the number 320*b* of QoS group execution IO (a previous value), and the number 320*c* of in-controller execution IO (an update value).

In the QoS group ID 320*a*, an identifier uniquely representing a QoS group that is a control target is stored. In the number 320*b* of QoS group execution IO (the previous value), the number of IO per unit time at the time of the previous update of a logical device belonging to a target QoS group that is executed by all of the controllers in the system of the QoS group is stored (the details of the calculation thereof will be described below). In the number 320*c* of in-controller execution IO (the update value), the number of IO per unit time of a logical device belonging to a target QoS group that is executed by the own controller after the previous update is stored.

The configuration information table 300 is a table for managing the configuration information with respect to the storage device 100 and the QoS group that is placed on the in-controller shared memory 122, and as illustrated in FIG. 5, includes each field of a QoS group ID 300*a*, a QoS group IO upper limit value 300*b*, and the number 300*c* of controllers in the system.

In the QoS group ID 300*a*, an identifier uniquely representing a QoS group that is a control target is stored. In the QoS group IO upper limit value 300*b*, an upper limit value of the number of IO per unit time with respect to a QoS group that is set by a system manager is stored. In the number 300c of controllers in the system, the number of controllers 110 accessing the logical device of the QoS group is stored. For example, in the configuration of the storage device 100 illustrated in FIG. 1, the number of controllers in the system is 2.

Next, the concept with respect to the control of the invention will be described with reference to FIG. 6 and FIGS. 7A and 7B.

Figure 6:
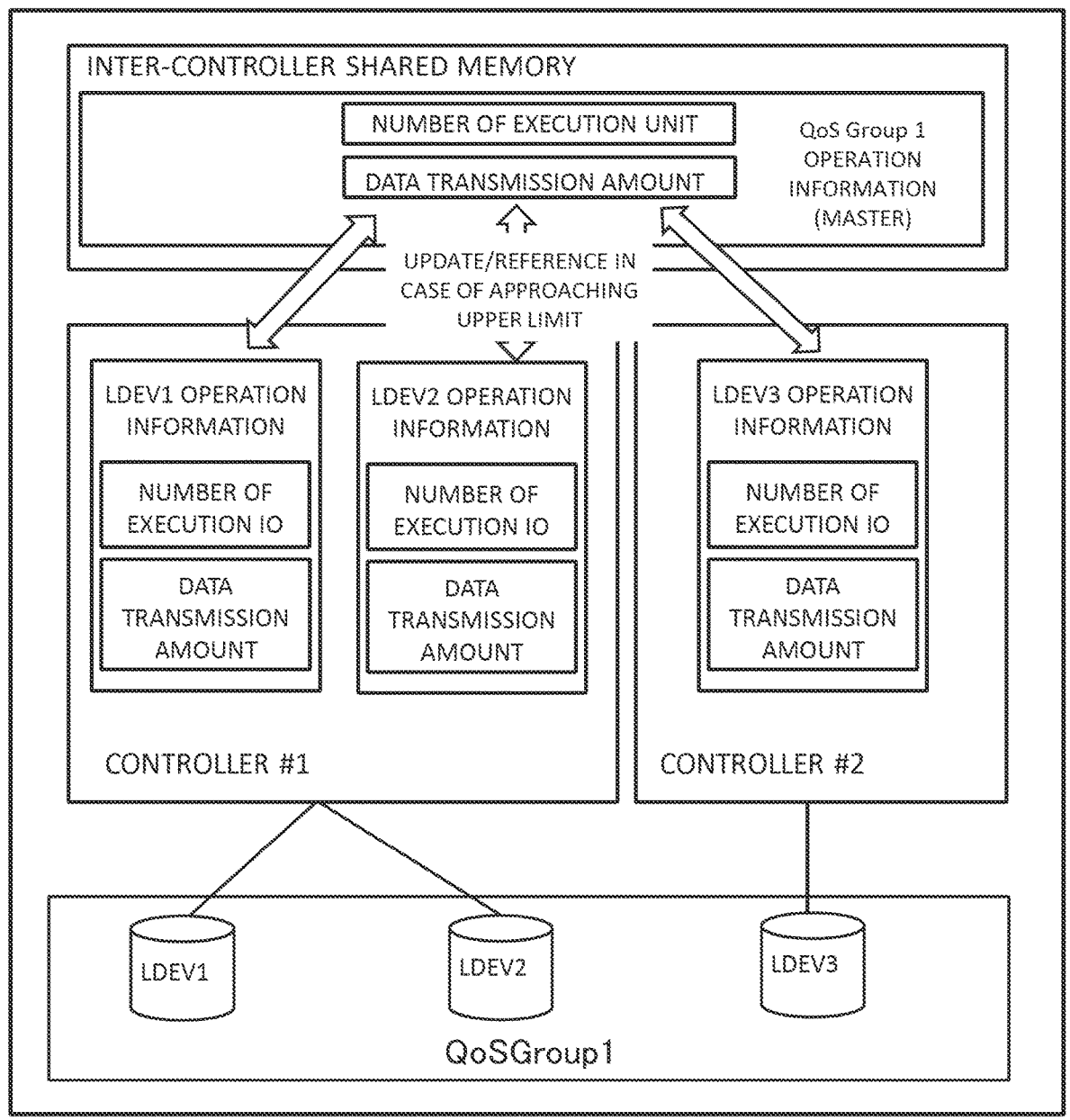
FIG. 6 is a diagram describing a way of accessing operation information in a QoS group and a controller according to the first embodiment.

Here, a way of accessing the operation information in the QoS group and the controller will be described on the premise of the configuration of the storage device 100 as illustrated in FIG. 6. In the example of FIG. 6, a logical device 1: LDEV1, a logical device 2: LDEV2, and a logical device 3: LDEV3 are defined in QoS Group 1 of the QoS group, and CTL1 and CTL2 access the data, as the controller.

Examples of the operation information of QoS Group 1 include the number of execution IO with respect to a logical device and a data transmission amount, and in the first embodiment, only the number of execution IO is considered. Note that, hereinafter, the number of execution IO indicates the number of IO per unit time.

The concept of the control with respect to the storage device of the invention is to adjust an update•reference frequency with respect to the operation information of the entire QoS group that is stored in the inter-controller shared memory 121, in accordance with an approach degree with respect to the upper limit value, in order to reduce the access with respect to the inter-controller shared memory 121.

Hereinafter, the details will be sequentially described.

(1) In each of the controllers, the number of execution IO is allocated by using the in-controller shared memory 122 when IO processing is performed for each of the logical devices.

(2) The number of execution IO to be compared with the QoS group IO upper limit value is calculated by (Expression 1) described below, by adding the number of executions of the entire group from the value saved in (1) and the operation information tabulated in the in-controller shared memory 122 at the present time when IO is activated from a queue of logical device unit.

"Number of Execution *IO* of QoS Group"+"Number of In-Controller Execution *IO*"     (Expression 1)

Then, in a case where the value calculated by (Expression 1) is greater than or equal to the QoS group IO upper limit value, IO is not activated from the queue of the logical device unit, and in a case where the QoS group IO upper limit value is less than the value calculated by (Expression 1), IO is activated from the queue of the logical device unit.

(3) When IO is activated from the queue of the logical device unit, the number of IO of the own controller before update in the in-controller shared memory 122 read, an IO amount of the own controller is added to data before update to be saved in the number of IO of the own controller.

(4) Next, an inter-controller shared memory update interval threshold value is calculated by using (Expression 2) described below.

Inter-Controller Shared Memory Update Interval Threshold Value=("QoS Group *IO* Upper Limit Value"−("Number of QoS Group Execution *IO*"+"Number of In-Controller Execution *IO*"))×"Margin Ratio Coefficient"÷"Number of Controllers in System"     (Expression 2)

Here, the QoS group IO upper limit value is an upper limit value of the total number of IO of a logical device belonging to the QoS group, the number of QoS group execution IO is the number of executions of IO with respect to the logical device belonging to the QoS group, and the number of in-controller execution IO is the number of executions of IO with respect to the logical device by the controller, the margin ratio coefficient is a coefficient representing a constant ratio, and for example, 0.05=5% is set. The margin ratio coefficient may be fixed, or may be input from the management terminal 20 such that the system can be flexibly handled in accordance with an operation result.

In addition, the number of QoS group execution IO is retained in both of the inter-controller shared memory 121 and the in-controller shared memory 122, and the number of in-controller execution IO is retained in the in-controller shared memory 122.

(5) In a case where the number of execution IO in the controller reaches the inter-controller shared memory update interval threshold value calculated by (Expression 2), the number of in-controller execution IO allocated in the controller is added to the number of QoS group execution IO of the inter-controller shared memory. In a case where the number of execution IO in the controller does not reach the inter-controller shared memory update interval threshold value, the number of IO is added to the number of in-controller execution IO, and tabulation processing is completed.

(6) In a case where the addition is performed with respect to the inter-controller shared memory in (5), the operation information in the controller is cleared. The tabulation processing is completed after clearing.

According to such processing, the accuracy of controlling the upper limit value of the QoS group can be maintained, and when the number of execution IO in the controller does not reach the inter-controller shared memory update interval threshold value defined by (Expression 2) (when there is a margin to reach the QoS group IO upper limit value), only the in-controller shared memory 122 is accessed, and the inter-controller shared memory 121 is not accessed, and thus, the performance of the IO processing with respect to memory access can be prevented from being degraded.

Next, the concept of an update interval of the operation information stored in the inter-controller shared memory will be described with reference to FIGS. 7A and 7B.

Figure 7A:
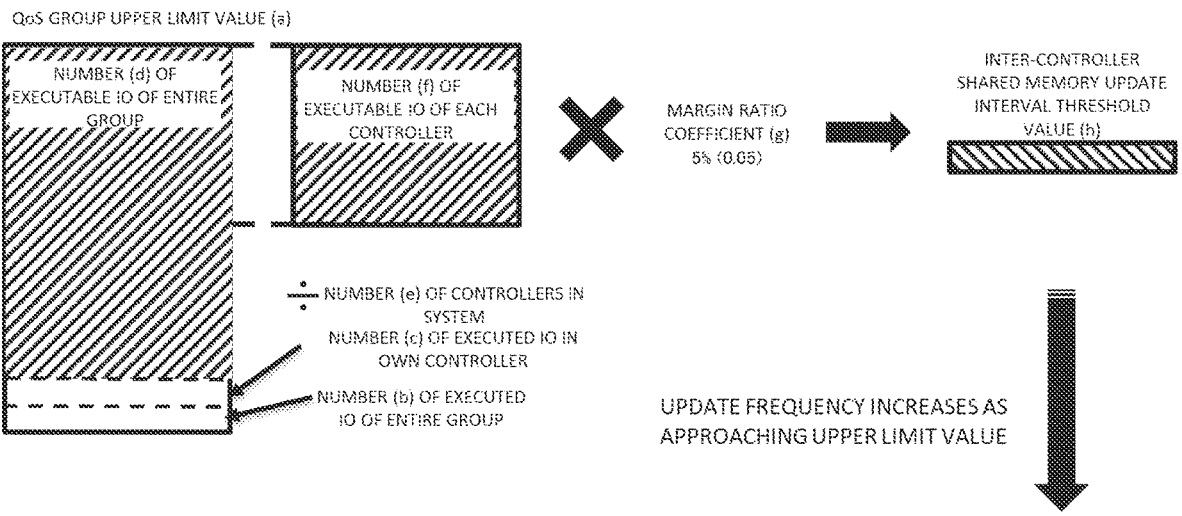
FIGS. 7A and 7B are diagrams describing an update interval of the operation information stored in an inter-controller shared memory.
Figure 7B:
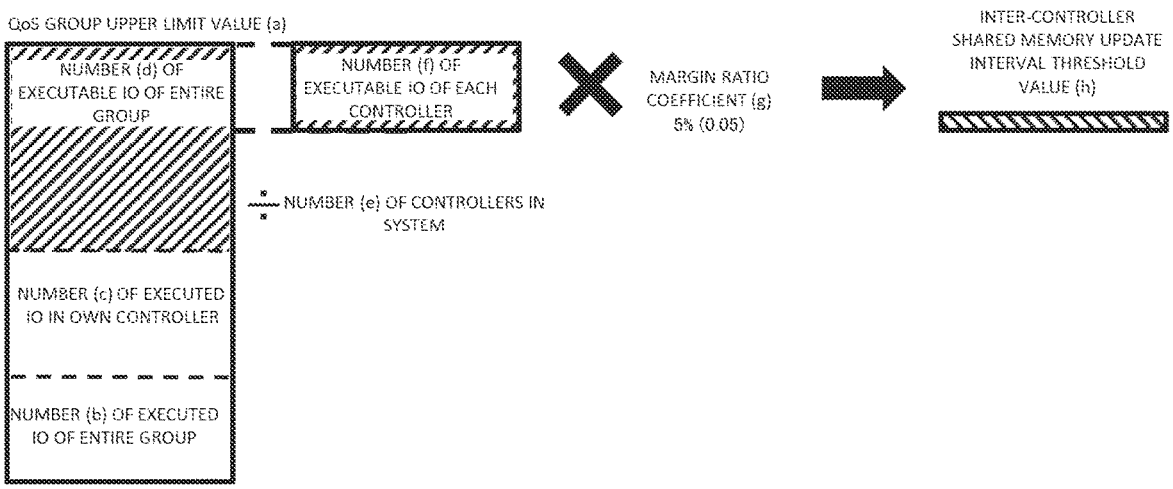

Here, FIG. 7A illustrates a case where the number of in-controller execution IO has a margin with respect to the QoS group IO upper limit value, and FIG. 7B illustrates a case where the number of in-controller execution IO does not have a margin with respect to the the QoS group IO upper limit value. As illustrated, in a case where the number of in-controller execution IO has a margin with respect to the QoS group IO upper limit value, the inter-controller shared memory update interval threshold value increases, and in a case where the number of in-controller execution IO does not have a margin with respect to the QoS group IO upper limit value, the inter-controller shared memory update interval threshold value decreases.

In order to calculate the inter-controller shared memory update interval threshold value (h), first, the number (b) of executed IO of the entire group until the previous update and the number (c) of executed IO in the own controller are subtracted from the QoS group upper limit value (a), and the number (d) of remaining executable IO of the entire system is calculated.

Next, the number (d) of remaining executable IO of the entire system is divided by the number (e) of controllers in the system, and thus, the number (f) of remaining executable IO of each of the controllers is calculated.

In order to prevent the exceedance of the upper limit value due to a deviation generated in the IO processing of the controller that is caused by unexpected IO inflow or the like, the update interval is set for each margin ratio coefficient (g) (for example, 5%). Accordingly, the inter-controller shared memory update interval threshold value (h) is calculated by Number (f) of Remaining Executable IO of Each Controller×Margin Ratio Coefficient (g).

As described above, the inter-controller shared memory update interval threshold value (h) is set, and thus, each of the controllers does not access the inter-controller shared memory 121 while falling within the inter-controller shared memory update interval threshold value (h), and the number of IO is counted only by the in-controller shared memory 122.

Accordingly, when the number of in-controller execution IO is small, the inter-controller shared memory 121 is not accessed, and thus, the performance of the IO processing is not degraded. In addition, when the number of in-controller execution IO increases, and the number of IO of QoS group approaches the QoS group IO upper limit value, the inter-controller shared memory update interval threshold value (h) decreases, and an update frequency for counting the number of IO with respect to the inter-controller shared memory also increases, and thus, a mechanism that is capable of controlling a QoS upper limit value with a high accuracy is attained.

Figure 8:
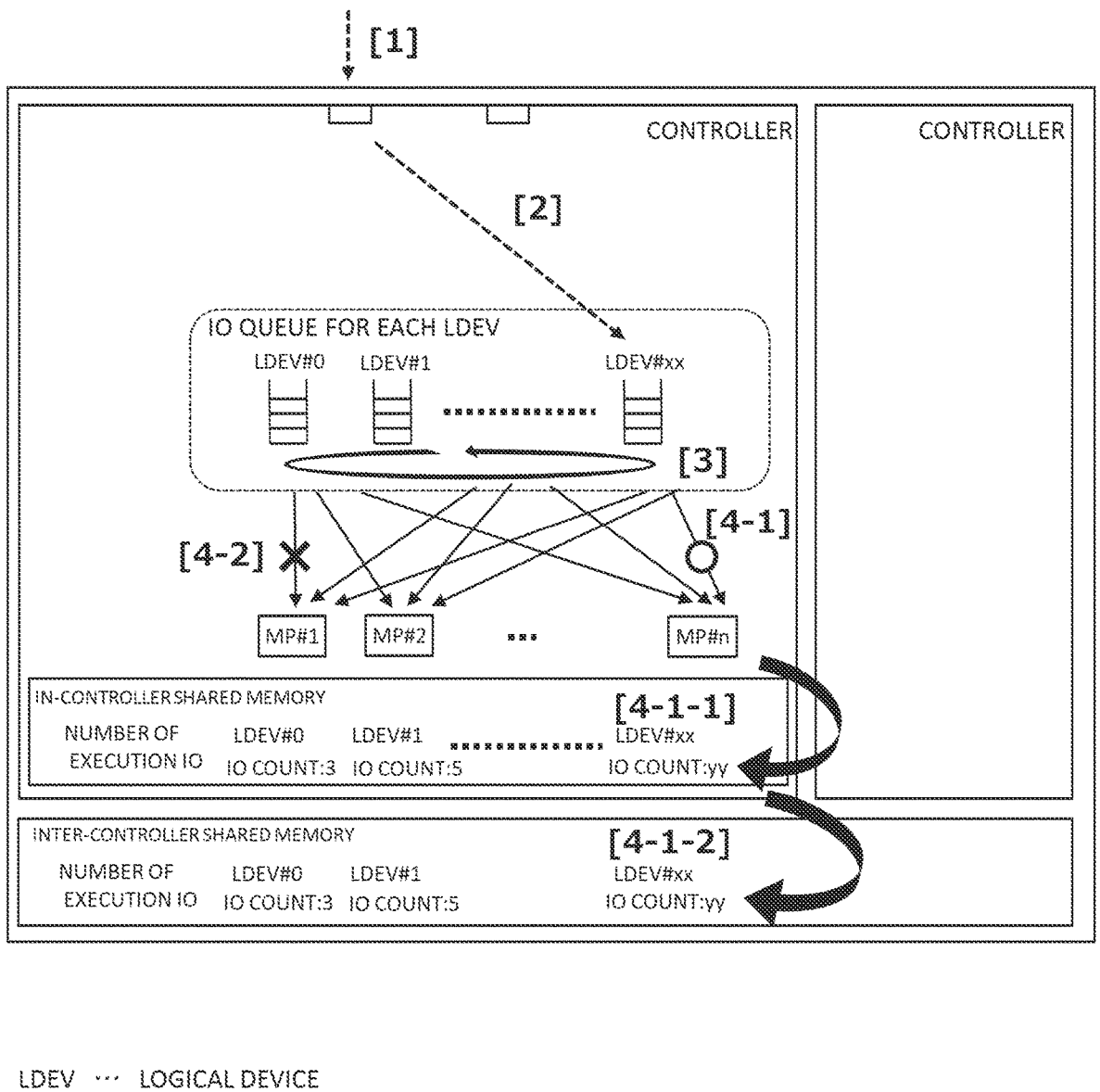
FIG. 8 is a diagram illustrating a memory access outline in a case where IO is received from a host according to the first embodiment.
Figure 9:
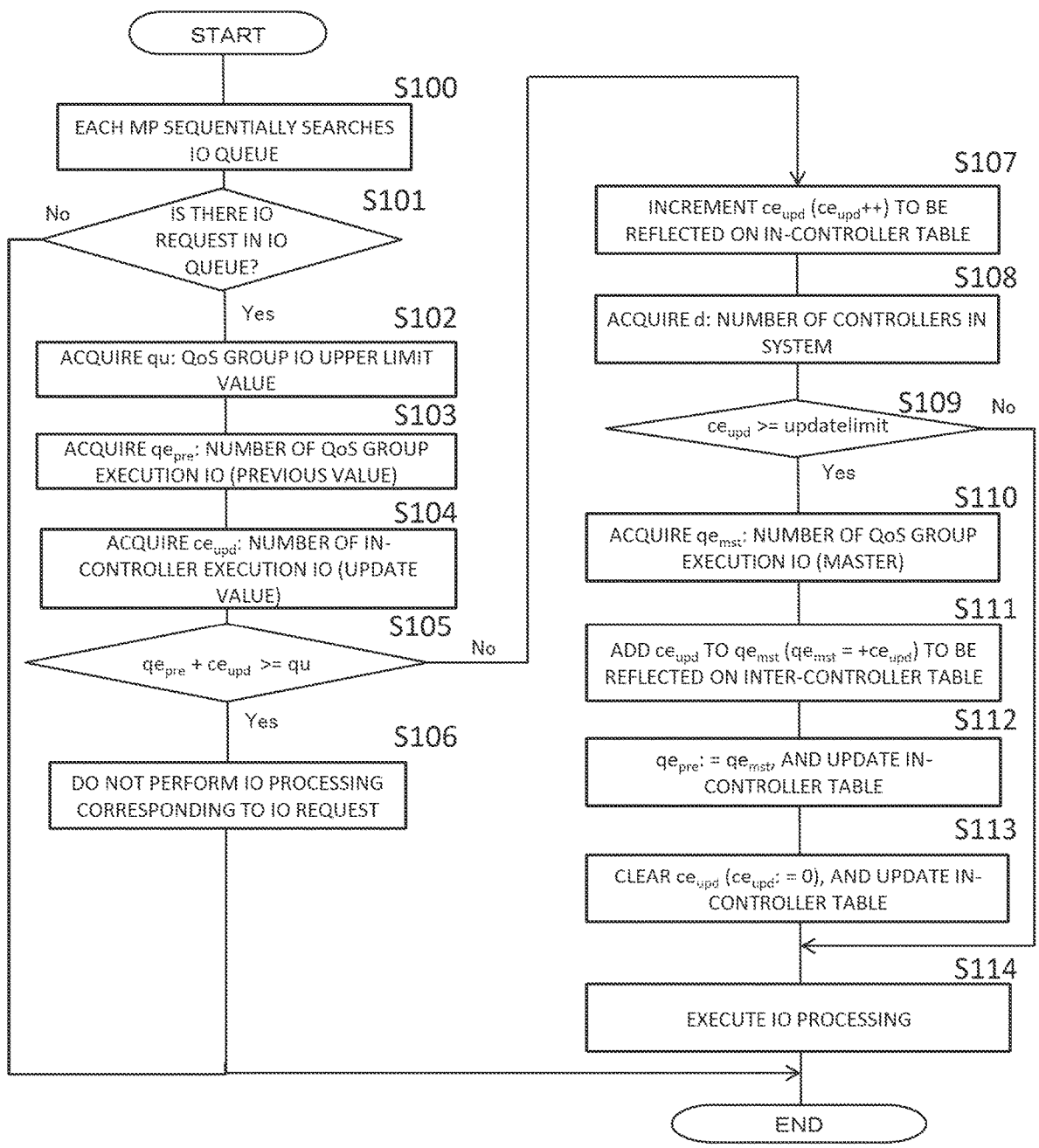
FIG. 9 is a flowchart illustrating the details of IO control of a controller of a storage device according to the first embodiment.

Next, the processing of the storage device according to the first embodiment will be described with reference to FIG. 8 and FIG. 9.

First, a memory access outline in a case where IO is received from the host will be described with reference to FIG. 8.

As a premise, the controller 110 of the storage device 100 has the ownership of each of the logical devices 201, and QoS control of the logical device 201 is implemented by the controller 110 having the ownership.

[1] The controller 110 of the storage device 100 receives the IO request from the host 10 through the channel adapter 101.

[2] The received IO request is transmitted to the controller on the logical device ownership side, and is enqueued (queued) on an IO queue prepared for each of the logical devices. Here, the IO queue is a data structure of first in first out (FIFO).

[3] Each of the MPs 131 in the controller sequentially checks the IO queue of each of the logical devices 201.

In a case where the IO request is received, the following values of the QoS group to which the logical device belongs are acquired from the in-controller shared memory.

qu: QoS Group IO Upper Limit Value
$qe_{pre}$: Number of QoS Group Execution IO (Previous Value)
$ce_{upd}$: Number of In-Controller Execution IO (Update Value)

Then, qu and ($qe_{pre}+ce_{upd}$) are compared, and it is determined whether or not ($qe_{pre}+ce_{upd}$) reaches qu.

[4-1] In the case of not reaching qu: QoS Group IO Upper Limit Value, the controller 110 executes the IO processing according to the IO request.

[4-1-1] Next, the number of IO execution is added to the number of in-controller execution IO (the update value) of the in-controller shared memory 122.

[4-1-2] Next, updatelimit: Inter-Controller Shared Memory Update Interval Threshold Value is calculated by (Expression 3).

$$\text{updatelimit}=((qu-qe_{pre}-ce_{upd})\times k)/d \quad \text{(Expression 3)}$$

Here, d is the number of controllers in the system, and k is the margin ratio coefficient.

Then, a time when $ce_{upd}$: Number of In-Controller Execution IO (Update Value) is greater than or equal to the inter-controller shared memory update interval threshold value is used as an update opportunity, and the number of in-controller execution IO (the update value) is added to the number of QoS group execution IO (the previous value) stored in the inter-controller shared memory 121 to be updated at the time of the update opportunity.

[4-2] The IO processing according to the IO request is inhibited in the case of reaching qu: QoS Group IO Upper Limit Value.

Next, the details of the IO control of the controller of the storage device will be described with reference to FIG. 9.

First, the MP 131 of the controller 110 sequentially searches the IO queue of the logical device (S100).

Next, the MP 131 determines whether or not the IO request is stored in the IO queue (S101).

When the IO request is stored in the IO queue (S101: Yes), the processing proceeds to S102, and when the IO request is not stored in the IO queue (S101: No), the processing is ended.

When the IO request is stored in the IO queue, the value of the QoS group IO upper limit value 300b of the configuration information table 300 is acquired (S102), and the value is set to qu: QoS Group IO Upper Limit Value.

Next, the MP 131 acquires the value of the number 320b of QoS group execution IO (the previous value) of the in-controller operation information table 320 (S103). The value is set to $qe_{pre}$: Number of QoS Group Execution IO (Previous Value).

Next, the MP 131 acquires the value of the number 320c of in-controller execution IO (the update value) of the in-controller operation information table 320 (S104), and sets the value to $ce_{upd}$: Number of In-Controller Execution IO (Update Value).

Next, the MP 131 determines whether or not $qe_{pre}+ce_{upd} \geq qu$ is established (S105), and when $qe_{pre}+ce_{upd} \geq qu$ is established (S105: Yes), the IO processing corresponding to the IO request is not performed (S106), and the processing is ended, and when $qe_{pre}+ce_{upd} \geq qu$ is not established (S105: No), the processing proceeds to S107.

When $qe_{pre}+ce_{upd} \geq qu$ is not established, $ce_{upd}$ is incremented ($ce_{upd}$++), and the value of the number 320c of in-controller execution IO (the update value) of the in-controller operation information table 320 is written (S107).

Next, the MP 131 acquires the value of the number 300c of QoS controllers of the configuration information table 300 (S108), and sets the value to d: Number of Controllers in System.

Next, the MP 131 determines whether or not $ce_{upd} \geq$ updatelimit is established (S109), and when $ce_{upd} \geq$ updatelimit is established (S109: Yes), the processing proceeds to S110, and when $ce_{upd} \geq$ updatelimit is not established (S109: No), the processing proceeds to S114.

updatelimit: Inter-Controller Shared Memory Update Interval Threshold Value is determined by (Expression 3) described above.

Next, the MP 131 acquires the value of the number 310b of QoS group execution IO (the master) of the inter-controller shared operation information table 310 (S110), and sets the value to $qe_{mst}$: Number of QoS Group Execution IO (Master).

Next, the MP 131 adds $ce_{upd}$ to $qe_{mst}$ ($qe_{mst}$=+$ce_{upd}$), and updates the number 310b of QoS group execution IO (the master) of the inter-controller shared operation information table 310 (S111).

Next, $qe_{pre}$=$qe_{mst}$ is set, and the number 320b of QoS group execution IO (the previous value) of the in-controller operation information table 320 is updated (S112).

Next, the MP 131 clears $ce_{upd}$ ($ce_{upd}$: =0), and clears the value of the number 320c of in-controller execution IO (the update value) of the in-controller operation information table 320 (S113).

Next, the IO processing is executed (S114).

As described above, according to the control of the storage device described in this embodiment, the accuracy of controlling the upper limit value of the QoS group can be maintained, and when the number of execution IO in the controller does not reach the inter-controller shared memory update interval threshold value (when there is a margin to reach the QoS group IO upper limit value), only the in-controller shared memory 122 is accessed, and the inter-controller shared memory 121 is not accessed, and thus, the performance of the IO processing with respect to the memory access can be prevented from being degraded.

Second Embodiment

Hereinafter, a second embodiment according to the invention will be described with reference to FIG. 10 to FIG. 14.

In the first embodiment, in the operation information retained in the storage device, the memory access of the IO control information by the number of execution IO is controlled.

In this embodiment, an example will be described in which the memory access of the data transmission amount is controlled, in the operation information described in FIG. 6. Hereinafter, in this embodiment, a difference from the first embodiment will be mainly described.

First, a data structure that is used in a storage device of the second embodiment will be described with reference to FIG. 10 to FIG. 12.

As with the first embodiment, an inter-controller shared operation information table 410 is a table for managing the control information with respect to the QoS group shared in the controllers that is placed on the inter-controller shared memory 121, and as illustrated in FIG. 10, includes each field of a QoS group ID 410a and a QoS group executed data transmission amount (a master) 410b.

In the QoS group ID 410a, an identifier uniquely representing a QoS group that is a control target is stored. In the QoS group executed data transmission amount (the master) 410b, a data transmission amount per unit time with respect to a logical device belonging to a target QoS group that is executed by all of the controllers in the system of the QoS group is stored. The details of the data transmission amount will be described below.

As with the first embodiment, an in-controller operation information table 420 is a table for managing the control information with respect to the QoS group and the local control information in the own controller that is placed on the in-controller shared memory 122, and as illustrated in FIG. 11, includes each field of a QoS group ID 420a, a QoS group executed data transmission amount (a previous value) 420b, and an in-controller executed data transmission amount (an update value) 420c.

In the QoS group ID 420a, an identifier uniquely representing a QoS group that is a control target is stored. In the QoS group executed data transmission amount (a master) 420b, a data transmission amount per unit time at the time of the previous update of a logical device belonging to a target QoS group that is executed by all of the controllers in the system of the QoS group is stored (the details of the calculation thereof will be described below). In the in-controller executed data transmission amount (the update value) 420c, a data transmission amount per unit time of a logical device belonging to a target QoS group that is executed by the own controller after the previous update is stored.

A configuration information table 400 is a table for managing the configuration information with respect to the storage device 100 and the QoS group that is placed on the in-controller shared memory 122, and as illustrated in FIG. 12, includes each field of a QoS group ID 400a, a data transmission amount upper limit value 400b, and the number 400c of controllers in the system.

In the QoS group ID 400a, an identifier uniquely representing a QoS group that is a control target is stored. In the data transmission amount upper limit value 400b, an upper limit value of a data transmission amount per unit time with respect to a QoS group that is set by the system manager is stored. In the number 400c of controllers in the system, the number of controllers 110 accessing the logical device of the QoS group is stored.

Figure 13:
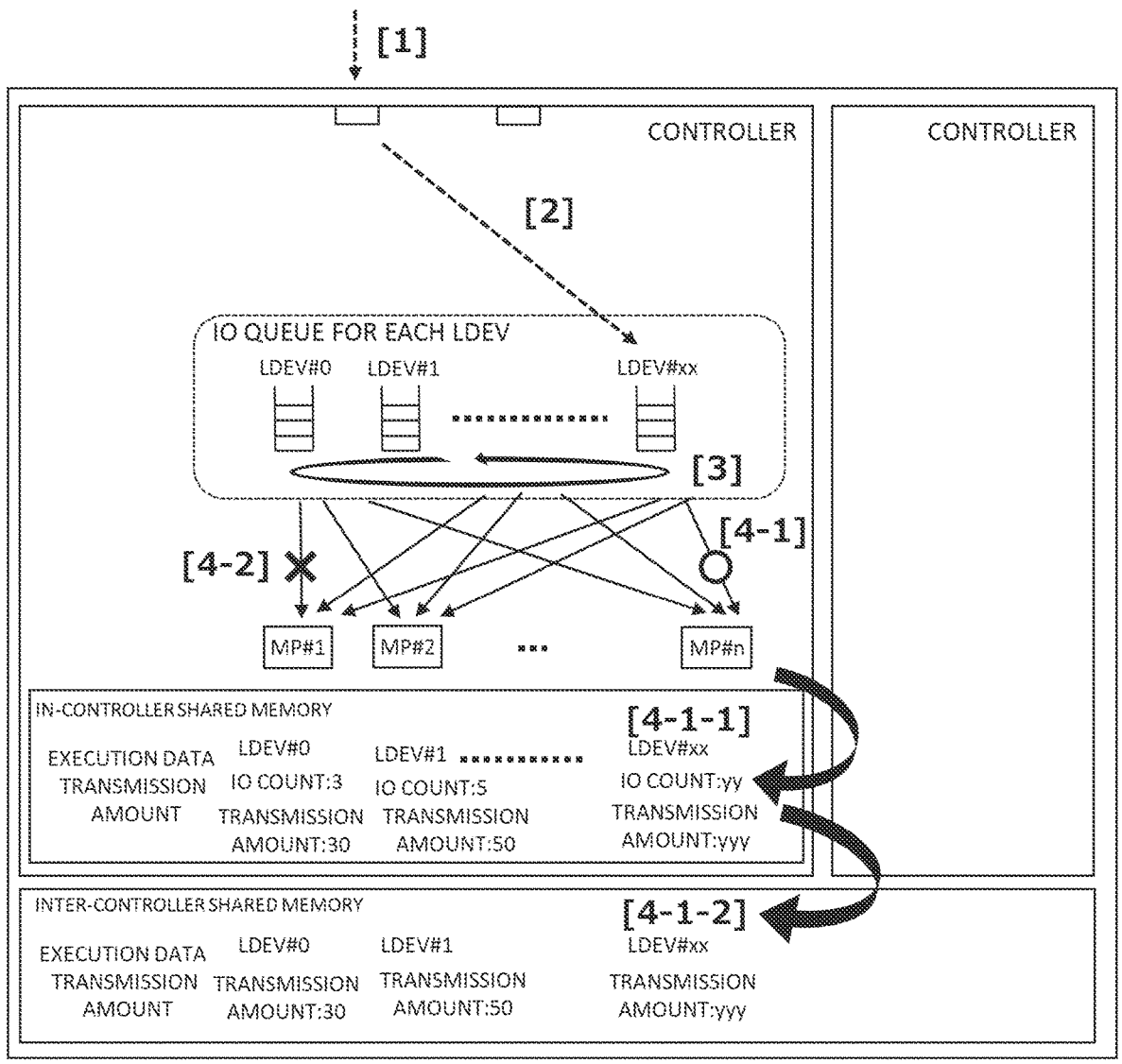
FIG. 13 is a diagram illustrating a memory access outline in a case where IO is received from a host according to the second embodiment.
Figure 14:
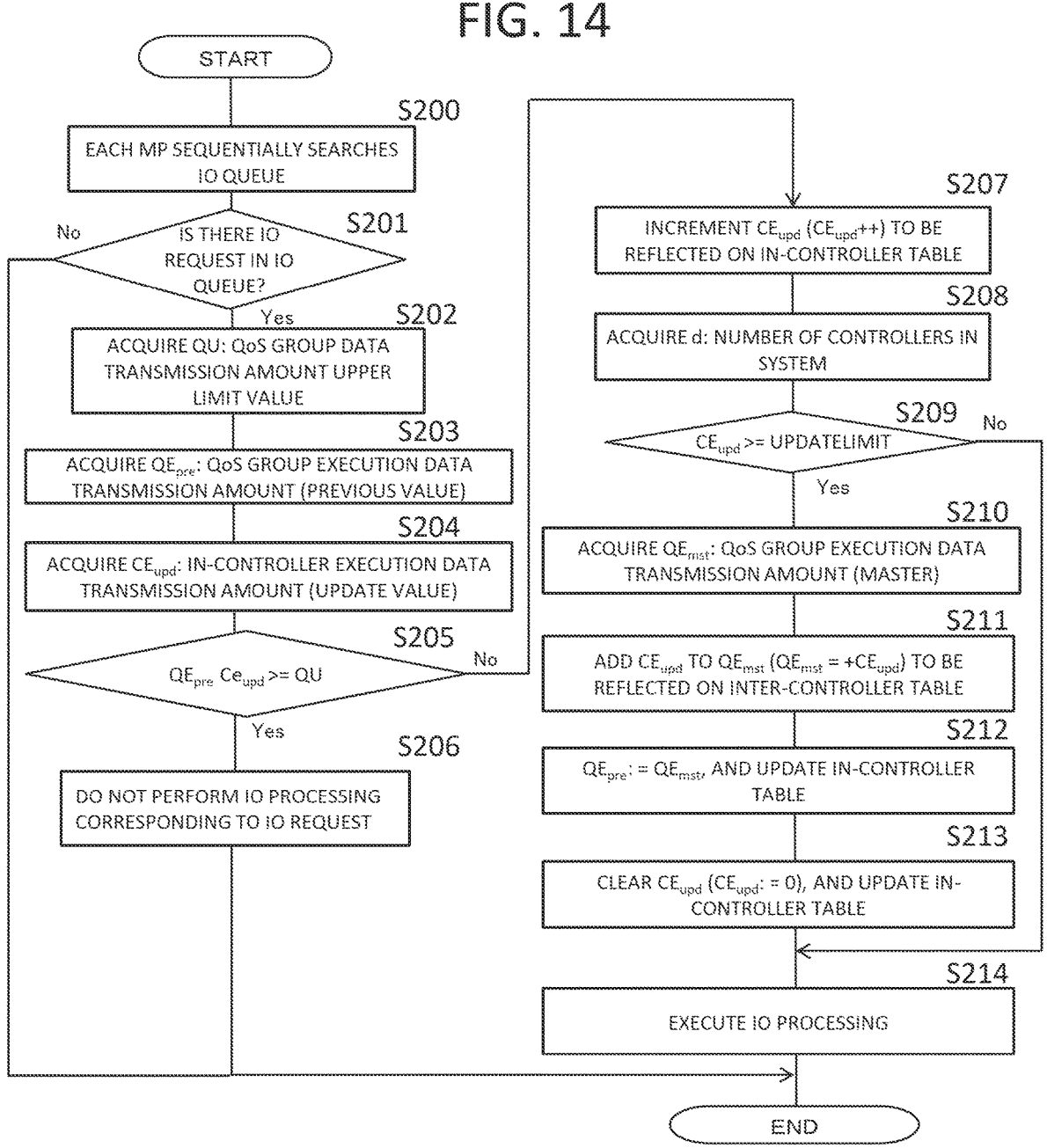
FIG. 14 is a flowchart illustrating the details of IO control of a controller of a storage device according to the second embodiment.

Next, the processing of the storage device according to the second embodiment will be described with reference to FIG. 13 and FIG. 14.

First, a memory access outline in a case where IO is received from the host will be described with reference to FIG. 13.

As with the first embodiment, as a premise, the controller 110 of the storage device 100 has the ownership of each of the logical devices 201, and the QoS control of the logical device 201 is implemented by the controller 110 having the ownership.

[1] The controller 110 of the storage device 100 receives the IO request from the host 10 through the channel adapter 101.

[2] The received IO request is transmitted to the controller on the logical device ownership side, and is enqueued on the IO queue prepared for each of the logical devices. Here, the IO queue is the data structure of the first in first out (FIFO).

[3] Each of the MPs 131 in the controller sequentially checks the IO queue of each of the logical devices 201.

In a case where the IO request is received, the following values of the QoS group to which the logical device belongs are acquired from the in-controller shared memory.

QU: QoS Group Data Transmission Amount Upper Limit Value $QE_{pre}$: QoS Group Execution Data Transmission Amount (Previous Value)

$CE_{upd}$: In-Controller Execution Data Transmission Amount (Update Value)

Then, QU and ($QE_{pre}$+$CE_{upd}$) are compared, and it is determined whether or not ($QE_{pre}$+$CE_{upd}$) reaches QU.

[4-1] In the case of not reaching QU: QoS Group Data Transmission Amount Upper Limit Value, the controller 110 executes the IO processing according to the IO request.

[4-1-1] Next, the data transmission amount is added to the in-controller execution data transmission amount (the update value) of the in-controller shared memory 122.

[4-1-2] Next, UPDATELIMIT: Inter-Controller Shared Memory Update Interval Threshold Value is calculated by (Expression 4).

$$UPDATELIMIT=((QU-QE_{pre}-CE_{upd})\times k)/d \quad \text{(Expression 4)}$$

Here, d is the number of controllers in the system, and k is the margin ratio coefficient.

Then, a time when $CE_{upd}$: In-Controller Execution Data Transmission Amount (Update Value) is greater than or equal to the inter-controller shared memory update interval threshold value is used as an update opportunity, and the in-controller execution data transmission amount (the update value) is added to the QoS group execution data transmission amount (the previous value) stored in the inter-controller shared memory 121 to be updated at the time of the update opportunity.

[4-2] The IO processing according to the IO request is inhibited in the case of reaching QU: QoS Group Data Transmission Amount Upper Limit Value.

Next, the details of the IO control of the controller of the storage device will be described with reference to FIG. 14.

First, the MP 131 of the controller 110 sequentially searches the IO queue of the logical device (S200).

Next, the MP 131 determines whether or not the IO request is stored in the IO queue (S201).

When the IO request is stored in the IO queue (S201: Yes), the processing proceeds to S202, and when the IO request is not stored in the IO queue (S201: No), the processing is ended.

When the IO request is stored in the IO queue, the value of the data transmission amount upper limit value 400b of the configuration information table 400 is acquired (S202), and the value is set to QU: QoS Group Data Transmission Amount Upper Limit Value.

Next, the MP 131 acquires the value of the QoS group execution data transmission amount (the previous value) 420b of the in-controller operation information table 420 (S203). The value is set to $QE_{pre}$: QoS Group Execution Data Transmission Amount (Previous Value).

Next, the MP 131 acquires the value of the in-controller executed data transmission amount (the update value) 420c of the in-controller operation information table 420 (S204), and sets the value to $CE_{upd}$: In-Controller Execution Data Transmission Amount (Update Value).

Next, the MP 131 determines whether or not $QE_{pre}+CE_{upd} \geq QU$ is established (S205), and when $QE_{pre}+CE_{upd} \geq QU$ is established (S205: Yes), the IO processing corresponding to the IO request is not performed (S206), and the processing is ended, and when $QE_{pre}+CE_{upd} \geq QU$ is not established (S205: No), the processing proceeds to S207.

When $QE_{pre}+CE_{upd} \geq QU$ is not established, $CE_{upd}$ is incremented ($CE_{upd}$++), and the value of the number 420c of in-controller execution IO (an update value) of the in-controller operation information table 420 is written (S207).

Next, the MP 131 acquires the value of the number 400c of controllers in the system of the configuration information table 400 (S208), and sets the value to d: Number of Controllers in System.

Next, the MP 131 determines whether or not $CE_{upd} \geq$ UPDATELIMIT is established (S209), and when $CE_{upd} \geq$ UPDATELIMIT is established (S209: Yes), the processing proceeds to S210, and when $CE_{upd} \geq$ UPDATELIMIT is not established (S209: No), the processing proceeds to S214.

UPDATELIMIT: Inter-Controller Shared Memory Update Interval Threshold Value is determined by (Expression 4) described above.

Next, the MP 131 acquires the value of the number 410b of QoS group execution IO (the master) of the inter-controller shared operation information table 410 (S210), and sets the value to $QE_{mst}$: QoS Group Execution Data Transmission Amount (Master).

Next, the MP 131 adds $CE_{upd}$ to $QE_{mst}$ ($QE_{mst}$+=$CE_{upd}$), and updates the number 410b of QoS group execution IO (the master) of the inter-controller shared operation information table 410 (S211).

Next, $QE_{pre}=QE_{mst}$ is set, and the QoS group execution data transmission amount (the previous value) 420b of the in-controller operation information table 420 is updated (S212).

Next, the MP 131 clears $CE_{upd}$ ($CE_{upd}$: =0), and clears the value of the in-controller executed data transmission amount (the update value) 420c of the in-controller operation information table 420 (S213).

Next, the IO processing is executed (S214).

As described above, in this embodiment, the number of IO of the first embodiment is replaced with the data transmission amount, and memory control of IO control information of the storage device is performed with the same inventive concept. Accordingly, as with the first embodiment, the accuracy of controlling the upper limit value of the QoS group can be maintained, and when the execution data transmission amount in the controller does not reach the inter-controller shared memory update interval threshold value (when there is a margin to reach the QoS group data transmission amount upper limit value), only the in-controller shared memory 122 is accessed, and the inter-controller shared memory 121 is not accessed, and thus, the performance of the IO processing with respect to the memory access can be prevented from being degraded.

What is claimed is:

1. A storage device performing reading and writing of data with respect to a logical device, in accordance with an IO request from a host,
   wherein the storage device includes one or more controllers, and
   one or more storage devices storing data,
   the controller includes a processor executing IO processing with respect to the IO request from the host, and
   a main memory storing control information of the IO processing,
   the main memory is divided into an in-controller shared memory that is accessed by only an own controller and an inter-controller shared memory that can be accessed by the other controller,
   stores the number of first group execution IO with respect to a logical device group, in the inter-controller shared memory,
   stores the number of second group execution IO with respect to the logical device group, and the number of in-controller execution IO, in the in-controller shared memory, and
   stores an upper limit value of the number of IO with respect to the logical device group, in the in-controller shared memory,
   the storage device performs queueing on an IO queue corresponding to each logical device when there is the IO request from the host,
   the processor of the storage device fetches an IO request from the queued IO queue,
   the processor of the storage device accesses the in-controller shared memory, and acquires the upper limit value of the number of IO with respect to the logical device group, the number of second group execution IO with respect to the logical device group, and the number of in-controller execution IO,
   the processor of the storage device compares the upper limit value of the number of IO with respect to the logical device group with a sum of the number of second group execution IO with respect to the logical device group and the number of in-controller execution IO, increments the number of in-controller execution IO when the sum of the number of second group execution IO with respect to the logical device group and the number of in-controller execution IO is less than the upper limit value of the number of IO with respect to the logical device group, and performs rewriting in the in-controller shared memory, the processor of the storage device compares the number of in-controller execution IO with an inter-controller shared memory update interval threshold value set by the following expression:

Inter-Controller Shared Memory Update Interval Threshold Value=("Upper Limit Value of Number of *IO* with respect to Logical Device Group"−("Number of Second Group Execution *IO* with respect to Logical Device Group"+"Number of In-Controller Execution *IO*"))×"Margin Ratio Coefficient"÷"Number of Controllers in System", the processor of the storage device acquires the number of first group execution IO with respect to the logical device group when the number of in-controller execution IO is greater than or equal to the inter-controller shared memory update interval threshold value, the processor of the storage device adds the number of in-controller execution IO to the number of first group execution IO with respect to the logical device group, and performs rewriting in the inter-controller shared memory, and the processor of the storage device writes the added number of first group execution IO with respect to the logical device group in the number of second group execution IO with respect to the logical device group of the in-controller shared memory, and clears the number of in-controller execution IO of the in-controller shared memory.

2. The storage device according to claim 1, wherein a management terminal is connected to the storage device, and the margin ratio coefficient is input.

3. A storage device performing reading and writing of data with respect to a logical device, in accordance with an IO request from a host, wherein the storage device includes one or more controllers, and one or more storage devices storing data, the controller includes a processor executing IO processing with respect to the IO request from the host, and a main memory storing control information of the IO processing, the main memory is divided into an in-controller shared memory that is accessed by only an own controller and an inter-controller shared memory that can be accessed by the other controller, stores a first group execution data transmission amount with respect to a logical device group, in the inter-controller shared memory, stores a second group execution data transmission amount with respect to the logical device group, and an in-controller execution data transmission amount, in the in-controller shared memory, and stores an upper limit value of a data transmission amount with respect to the logical device group, in the in-controller shared memory, the storage device performs queueing on an IO queue corresponding to each logical device when there is the IO request from the host, the processor of the storage device fetches an IO request from the queued IO queue, the processor of the storage device accesses the in-controller shared memory, and acquires the upper limit value of the data transmission amount with respect to the logical device group, the second group execution data transmission amount with respect to the logical device group, and the in-controller execution data transmission amount, the processor of the storage device compares the upper limit value of the data transmission amount with respect to the logical device group with a sum of the second group execution data transmission amount with respect to the logical device group and the in-controller execution data transmission amount, increments the in-controller execution data transmission amount when the sum of the second group execution data transmission amount with respect to the logical device group and the in-controller execution data transmission amount is less than the upper limit value of the data transmission amount with respect to the logical device group, and performs rewriting in the in-controller shared memory, the processor of the storage device compares the in-controller execution data transmission amount with an inter-controller shared memory update interval threshold value set by the following expression:

Inter-Controller Shared Memory Update Interval Threshold Value=("Upper Limit Value of Data Transmission Amount with respect to Logical Device Group"−("Second Group Execution Data Transmission Amount with respect to Logical Device Group"+"In-Controller Execution Data Transmission Amount"))×"Margin Ratio Coefficient"÷"Number of Controllers in System", the processor of the storage device acquires the first group execution data transmission amount with respect to the logical device group when the in-controller execution data transmission amount is greater than or equal to the inter-controller shared memory update interval threshold value, the processor of the storage device adds the in-controller execution data transmission amount to the first group execution data transmission amount with respect to the logical device group, and performs rewriting in the inter-controller shared memory, and the processor of the storage device writes the added first group execution data transmission amount with respect to the logical device group in the second group execution data transmission amount with respect to the logical device group of the in-controller shared memory, and clears the in-controller execution data transmission amount of the in-controller shared memory.

4. The storage device according to claim 3, wherein a management terminal is connected to the storage device, and the margin ratio coefficient is input.

5. A control method for a storage device performing reading and writing of data with respect to a logical device, in accordance with an IO request from a host, the storage device including one or more controllers, and one or more storage devices storing data, the controller including a processor executing IO processing with respect to the IO request from the host, and a main memory storing control information of the IO processing, the main memory being divided into an in-controller shared memory that is accessed by only an own controller and an inter-controller shared memory that can be accessed by the other controller, storing a first group execution operation value with respect to a logical device group, in the inter-controller shared memory, storing a second group execution operation value with respect to the logical device group, and an in-controller logical device execution operation value, in the in-controller shared memory, and storing an upper limit value of an operation value with respect to the logical device group, in the in-controller shared memory, the method comprising:

allowing the storage device to perform queueing on an IO queue corresponding to each logical device when there is the IO request from the host;

allowing the processor of the storage device to fetch an IO request from the queued IO queue;

allowing the processor of the storage device to access the in-controller shared memory, and to acquire the upper limit value of the operation value with respect to the logical device group, the second group execution operation value with respect to the logical device group, and the in-controller logical device execution operation value;

allowing the processor of the storage device to compare the upper limit value of the operation value with respect to the logical device group with a sum of the second group execution operation value with respect to the logical device group and the in-controller logical device execution operation value, to increment the in-controller logical device execution operation value when the sum of the second group execution operation value with respect to the logical device group and the in-controller logical device execution operation value is less than the upper limit value of the operation value with respect to the logical device group, and to perform rewriting in the in-controller shared memory;

allowing the processor of the storage device to compare the in-controller logical device execution operation value with an inter-controller shared memory update interval threshold value set by the following expression:

Inter-Controller Shared Memory Update Interval Threshold Value=("Upper Limit Value of Operation Value with respect to Logical Device Group"–("Second Group Execution Operation Value with respect to Logical Device Group"+"In-Controller Logical Device Execution Operation Value"))×"Margin Ratio Coefficient"÷"Number of Controllers in System";

allowing the processor of the storage device to acquire the first group execution operation value with respect to the logical device group when the in-controller logical device execution operation value is greater than or equal to the inter-controller shared memory update interval threshold value;

allowing the processor of the storage device to add the in-controller logical device execution operation value to the first group execution operation value with respect to the logical device group, and to perform rewriting in the inter-controller shared memory; and allowing the processor of the storage device to write the added first group execution operation value with respect to the logical device group in the second group execution operation value with respect to the logical device group of the in-controller shared memory, and to clear the in-controller logical device execution operation value of the in-controller shared memory.

6. The control method for a storage device according to claim 5, wherein the operation value is the number of execution IO or a data transmission amount with respect to the logical device.

* * * * *